(12) United States Patent
Kowalchik et al.

(10) Patent No.: US 7,502,886 B1
(45) Date of Patent: *Mar. 10, 2009

(54) DATA STORAGE DEVICE WITH TWO-TIER RAID CONTROL CIRCUITRY

(75) Inventors: Michael Kowalchik, Arlington, MA (US); John T. Cardente, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 79 days.

This patent is subject to a terminal disclaimer.

(21) Appl. No.: 10/731,622

(22) Filed: Dec. 9, 2003

Related U.S. Application Data

(63) Continuation-in-part of application No. 10/004,090, filed on Oct. 23, 2001, now Pat. No. 7,174,422.

(51) Int. Cl.
*G06F 12/16* (2006.01)
(52) U.S. Cl. ............... 711/114; 711/162; 714/6; 714/7
(58) Field of Classification Search ............... 710/26, 710/52; 711/113, 119, 129, 161; 714/6; 360/133, 903; 369/75.1
See application file for complete search history.

(56) References Cited

U.S. PATENT DOCUMENTS

| | | | |
|---|---|---|---|
| 3,959,778 A | | 5/1976 | Brette |
| 4,766,581 A | | 8/1988 | Korn et al. |
| 5,195,100 A | | 3/1993 | Katz et al. |
| 5,359,726 A | * | 10/1994 | Thomas ................. 703/24 |
| 5,493,574 A | * | 2/1996 | McKinley ............... 714/773 |
| 5,630,093 A | * | 5/1997 | Holzhammer et al. ....... 711/115 |
| 5,721,956 A | | 2/1998 | Martin et al. |
| 5,754,888 A | | 5/1998 | Yang et al. |
| 5,787,466 A | | 7/1998 | Berliner |
| 5,805,787 A | * | 9/1998 | Brant et al. ................ 714/6 |
| 5,845,104 A | * | 12/1998 | Rao ......................... 711/113 |
| 5,890,207 A | | 3/1999 | Sne et al. |
| 5,911,779 A | | 6/1999 | Stallmo et al. |
| 5,933,853 A | | 8/1999 | Takagi |
| 6,078,498 A | * | 6/2000 | Eckerd et al. ............. 361/685 |
| 6,101,576 A | | 8/2000 | Kobayashi et al. |
| 6,389,510 B1 | | 5/2002 | Chen et al. |

OTHER PUBLICATIONS

Andrew S. Tannenbaum, Modern Operating Systems, published 2001, pp. 300-306.
Web Site: http://www.pcwebopaedia.com/TERM/D/disk_cache.html, "Disk Cache", last revised: May 15, 1998, publication date unknown.
Title: Symmetrix 8000: Product Description Guide.

* cited by examiner

*Primary Examiner*—Kevin Verbrugge
(74) *Attorney, Agent, or Firm*—Krishnendu Gupta; Scott A. Ouellette

(57) ABSTRACT

A data storage device includes a device interface for receiving data access requests, a plurality of non-volatile memory devices and a controller that accesses the non-volatile memory devices in response to the received data access requests. The plurality of non-volatile memory devices include at least one of flash memory; compact flash memory; magnoresistive RAM; ferroelectric RAM; any type of volatile memories, such as dynamic and static RAM, maintained as non-volatile with the use of a power subsystem; mechanical memory devices and microelectromechanical memory devices.

14 Claims, 13 Drawing Sheets

DATA STORAGE DEVICE WITH TWO-TIER RAID CONTROL CIRCUITRY

REFERENCE TO RELATED APPLICATIONS

This application is a Continuation-in-Part of U.S. application Ser. No. 10/004,090, filed on Oct. 23, 2001, now U.S. Pat. No. 7,174,422, entitled Data Storage Device with Two-Tier Raid Control Circuitry.

BACKGROUND

In many ways, a computer disk is much like an old fashioned record player. That is, most disks include a platter spun by a rotating spindle. A disk head, controlled by a disk head actuator, moves about the spinning platter reading or writing information in different platter locations. Thus, to read or write data, the disk head actuator moves the disk head relative to the platter to await the location of interest to spin underneath.

Disks vary widely in their characteristics. For example, disks differ in the number of bits they can store. Disk capacity is often measured in Megabytes or Gigabytes. Disks also vary in their density. That is, some disks offer more storage for their size than others.

The performance of a disk can be measured in a number of ways. For example, performance can be measured by bandwidth (e.g., bits or bytes per second) or throughput (e.g., IOPS (Input/Output requests per Second)). Another performance measurement known, as "data access density", measures IOPS per gigabit.

Disk capacities continue to grow rapidly, doubling roughly every 18 months. While also growing, data access speeds have generally failed to keep pace, doubling only every 24 months. Thus, while disk capacities and throughput grow, the disparity between their growth implies that the data access density for many storage systems has fallen. In other words, while there is more data being stored in less space, it can be accessed less often.

SUMMARY

In one aspect, the disclosure describes a data storage device including a device interface for receiving data access requests, a device housing conforming to a standard form factor, a plurality of non-volatile memory devices housed within the device housing and a controller that accesses the non-volatile memory devices in response to the received data access requests.

The interface may include an interface configured to conform to a protocol. The protocol may include at least one of the following: SCSI (Small Computer System Interface), Fibre Channel, and Infiniband. The plurality of non-volatile memory devices may include at least one of flash memory; compact flash memory; magnoresistive RAM; ferroelectric RAM; any type of volatile memories, such as dynamic and static RAM, maintained as non-volatile with the use of a power subsystem; mechanical memory devices and microelectromechanical memory devices. The device housing may conform to at least one of the following standard form factors: full-height, half-height, and low-profile. The controller may include a controller configured to implement a RAID scheme. The scheme implemented by the controller may include a RAID scheme independent of a hierarchically higher RAID controller that sends the data storage device RAID data. The data storage device may further include a cache manager. The cache manager may include a manager configured to perform at least one of the following: translate an address of a different storage device to a cache address; cache data included in a write request; load data from the different storage device; and remove cached data. The data storage device may include a controller card that includes the controller and connections available to couple with more than one storage card that provides access to the plurality of non-volatile memory devices. The storage card may include a card having at least one parallel interface to a collection of the drives. The connection between the controller and the storage card may include a serial connection. The controller may include a bank interface that routes data requests to an appropriate bank of drives.

According to another aspect, the disclosure describes a data storage system including at least one first data storage device having a platter size of at least 3.5 inches in diameter and at least one second data storage device. The second data storage device includes a device interface for receiving data access requests; a device housing conforming to a standard form factor; a plurality of non-volatile memory devices housed within the device housing; and a first controller configured to receive data access requests from the device interface. The system also includes a second controller that coordinates data access to the at least one first data storage device and the at least one second data storage device.

The plurality of non-volatile memory devices may include at least one of flash memory; compact flash memory; magnoresistive RAM; ferroelectric RAM; any type of volatile memories, such as dynamic and static RAM, maintained as non-volatile with the use of a power subsystem; mechanical memory devices and microelectromechanical memory devices.

According to another aspect, the disclosure describes a method of servicing data access requests at a data storage device, the method including receiving data access requests at a device interface of the data storage device and accessing a plurality of non-volatile memory devices housed within a standard form factor device housing in response to the received data access requests.

The plurality of non-volatile memory devices may include at least one of flash memory; compact flash memory; magnoresistive RAM; ferroelectric RAM; any type of volatile memories, such as dynamic and static RAM, maintained as non-volatile with the use of a power subsystem; mechanical memory devices and microelectromechanical memory devices.

According to another aspect, the disclosure describes a data storage device including a device interface for receiving data access requests; a plurality of non-volatile memory devices and a controller that accesses the non-volatile memory devices in response to the received data access requests. The controller includes a controller configured to implement a RAID scheme.

The scheme implemented by the controller may include a RAID scheme independent of a hierarchically higher RAID controller that sends the data storage device RAID data.

According to another aspect, the disclosure describes a data storage device including a device interface for receiving data access requests; a plurality of non-volatile memory devices; and a controller that accesses the non-volatile memory devices in response to the received data access requests. The plurality of non-volatile memory devices include at least one of flash memory; compact flash memory; magnoresistive RAM; ferroelectric RAM; any type of volatile memories, such as dynamic and static RAM, maintained as non-volatile with the use of a power subsystem; mechanical memory devices and microelectromechanical memory devices.

According to another aspect, the disclosure describes a data storage device including a device interface for receiving data access requests; a plurality of non-volatile memory devices; and a controller that accesses the non-volatile memory devices in response to the received data access requests. The controller is configured to access the non-volatile memory devices in a manner that emulates access to a single disk drive.

DETAILED DESCRIPTION

Figure 1:
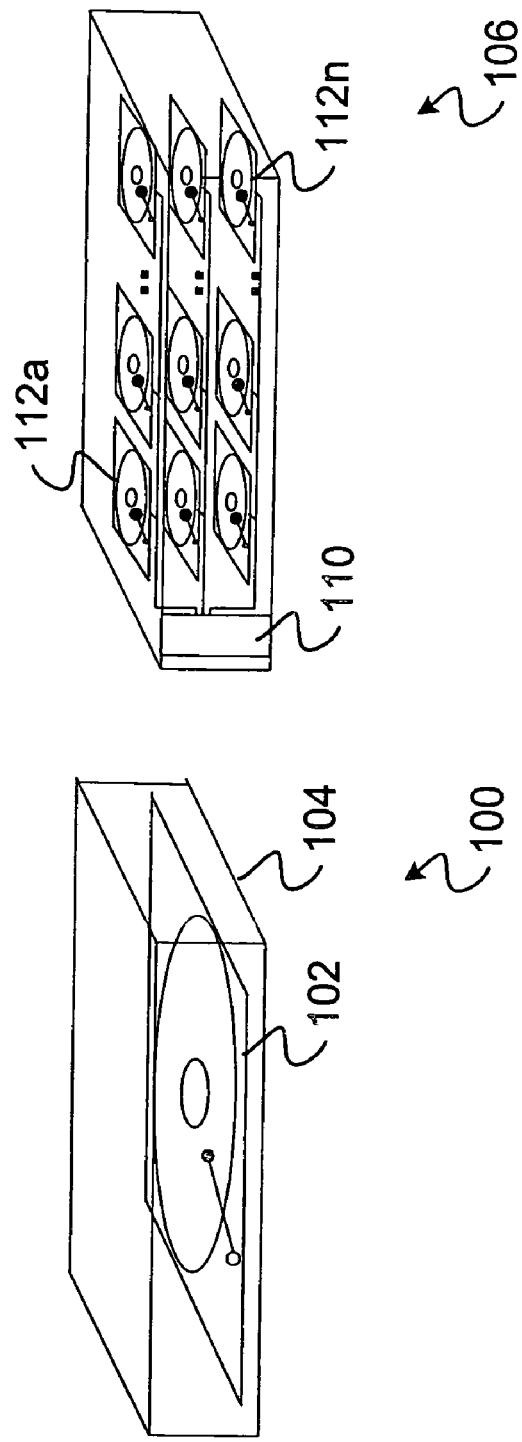
FIG. 1 is a diagram illustrating a data storage device.

FIG. 1 depicts a traditional data storage disk 100. As shown, the traditional data storage disk 102 features a platter 102 (e.g., a 3.5 inch diameter platter), disk read/write head(s), and electronics and an actuator that control the movement of the platter 102 and disk head(s). The disk 100 components are enclosed by a housing 104 that can conform to a wide variety of different standard form factors such as full height drives (4"×8"×3.25"), half-height drives (4"×"5.75"×1.6"), and low-profile drives (4"×5.75"×1").

Recently, drives featuring smaller sized platters have become available. For example, laptop computers often feature a disk having a 2.5-inch or 1.8-inch platter. Even smaller devices such as digital cameras and handheld computers feature disks with yet smaller platters. For example, IBM produces a MicroDrive™ having a 1-inch platter, roughly the size of a quarter. These disks feature their own independently operating disk head actuator. Generally, these smaller platter drives are slower than their larger counterparts and are generally not considered for use in high-performance computing.

While counter-intuitive, replacing a physically larger, higher capacity disk 102 with an array of smaller drives 112a-112n can improve the performance of a data storage system by increasing the numbers of spindles and independently actuated disk heads. For example, by accessing the drives 112a-112n in parallel, the device 106 can provide a desirable throughput (e.g., as measured in IOPS). That is, while individual "seeks" of a particular disk 112a-112n may actually take longer than a traditional disk 102, the device 106 may access different disks simultaneously and, therefore, respond to more requests in a given interval.

Additionally, the smaller disks 112a-112n can increase the number of independent drives in a given volume. For example, as shown in FIG. 1, n disks 112a-112n having platters less than 3.5 inches in diameter can fit in a standard form factor previously shown as holding a single 3.5 inch diameter platter 102. Thus, the increase in spindle density can potentially improve the combination of storage density (e.g., bits per area unit) and data access density offered by a device of a given size.

In greater detail, FIG. 1 illustrates a data storage device 104 that features a collection of smaller disks 112a-112n connected to a device controller 110. As shown, the disks 112a-112n and controller 110 can be enclosed, for example, in a housing 104 previously designed to store fewer disks. For example, the housing 104 may conform to a standard form factor (e.g., full height drives, half-height drives, or low-profile). Alternatively, the housing 104 may feature some other, non-standard, form (e.g., a custom design for rack-mounting).

The device 106 controller 110 may provide a device interface that emulates a traditional disk 100 interface. For example, the data storage interface may conform to an interconnectivity and/or communications interface protocol such as SCSI (Small Computer System Interface), Fibre Channel, INFINIBAND, and so forth. Thus, a system using the device 106 to store data could communicate with the device 106 as it would with a traditional device 100. This can permit a system manager to quickly upgrade the performance of a system by replacing a traditional disk 100 with device 106.

The controller 110 may use a wide variety of techniques to control data storage and retrieval using the collection of disks 112a-112n. The techniques can feature varying degrees of error detection, error protection, data redundancy, and/or throughput For example, the controller 110 may map different address ranges onto the disks.

Alternatively, the controller 110 may implement one of a wide variety of RAID (Redundant Array of Independent Disks) schemes. While some RAID schemes have been criticized for underutilizing disks, the collection of small disks can preserve and even increase the amount of data stored in a housing of a given size ("storage density") even when using a RAID scheme. Generally, different RAID schemes feature different combinations of techniques known as striping, mirroring, and error correction.

RAID schemes that use striping divide data being stored into different portions and store the portions on different disks. For example, striping of the data "EMC Corporation" may result in "EMC C" being stored in a first disk 112a, "orpor" in a second disk 112b, and "ation" in a third disk 112c. To retrieve the data, all three disks 112a-112c can operate in parallel. That is, each disk may independently and simultaneously seek their portion of the "EMC Corporation" data.

RAID schemes that use mirroring store copies of data on different disks. For example, two different disks may store a copy of the data "EMC Corporation". While storing data requires writing the information to both disks, the data can be retrieved from either device. For example, if one device is busy, the other can be used to retrieve the data. Mirroring also provides an increased measure of security. For example, if one disk malfunctions the other disk can be used without missing a beat.

Many RAID schemes also feature error correction/detection techniques. For example, many RAID schemes store an error correction code such as a Hamming Code for data being stored. The code can be used to reconstruct data even though some error occurred.

Generally, a level number identifies a particular RAID scheme. For example, RAID 0 identifies a simple RAID scheme that uses striping. RAID 1 identifies a RAID scheme that uses mirroring. Other generally known RAID schemes (e.g., RAID 2 to RAID 7, RAID 10, RAID 0+1, and RAID 53) feature combinations of the techniques described above. The controller 110 may use one or more of the RAID schemes identified above or some other RAID scheme.

Figure 2:
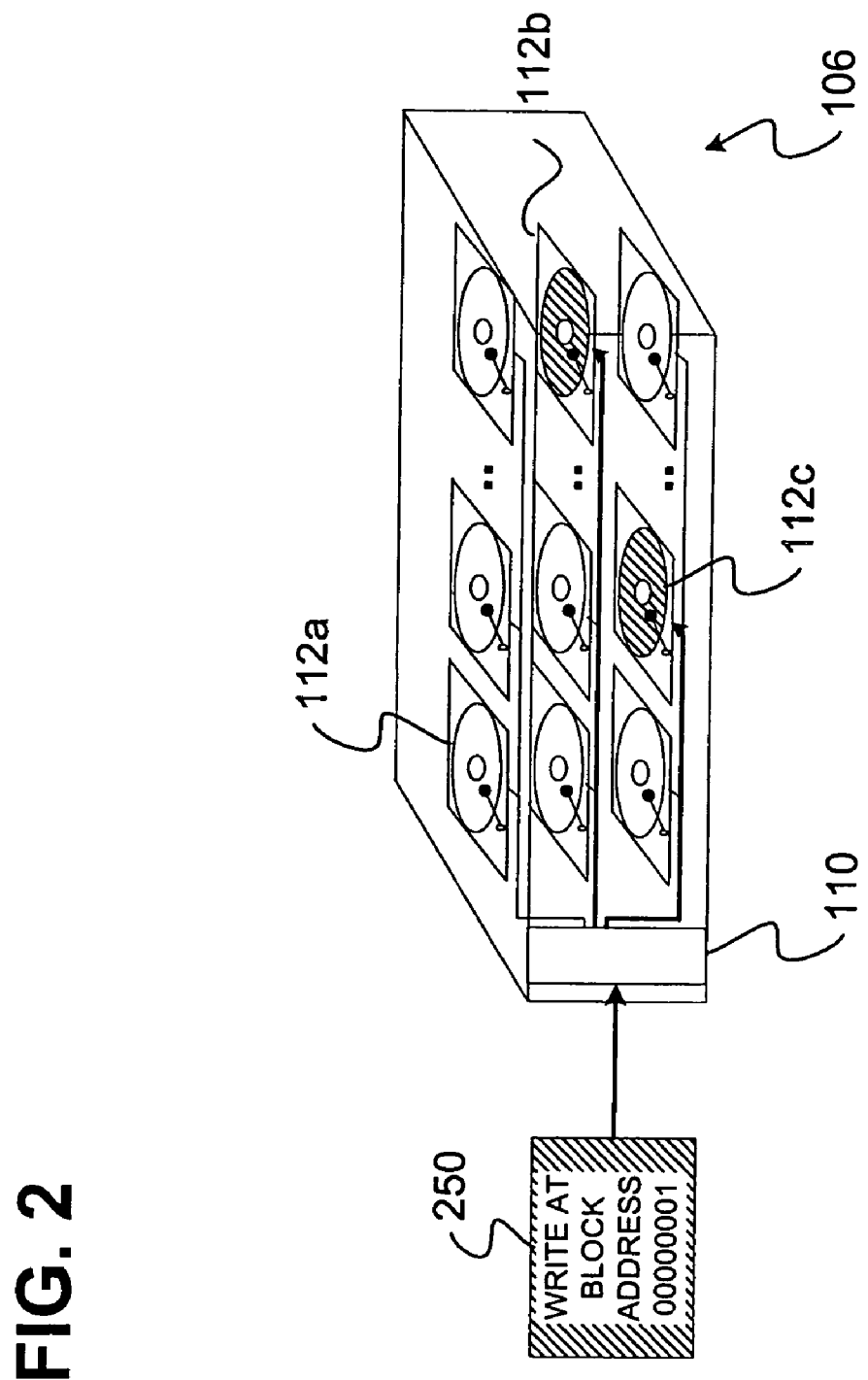
FIGS. 2-6 illustrate operation of the data storage device.
Figure 3:
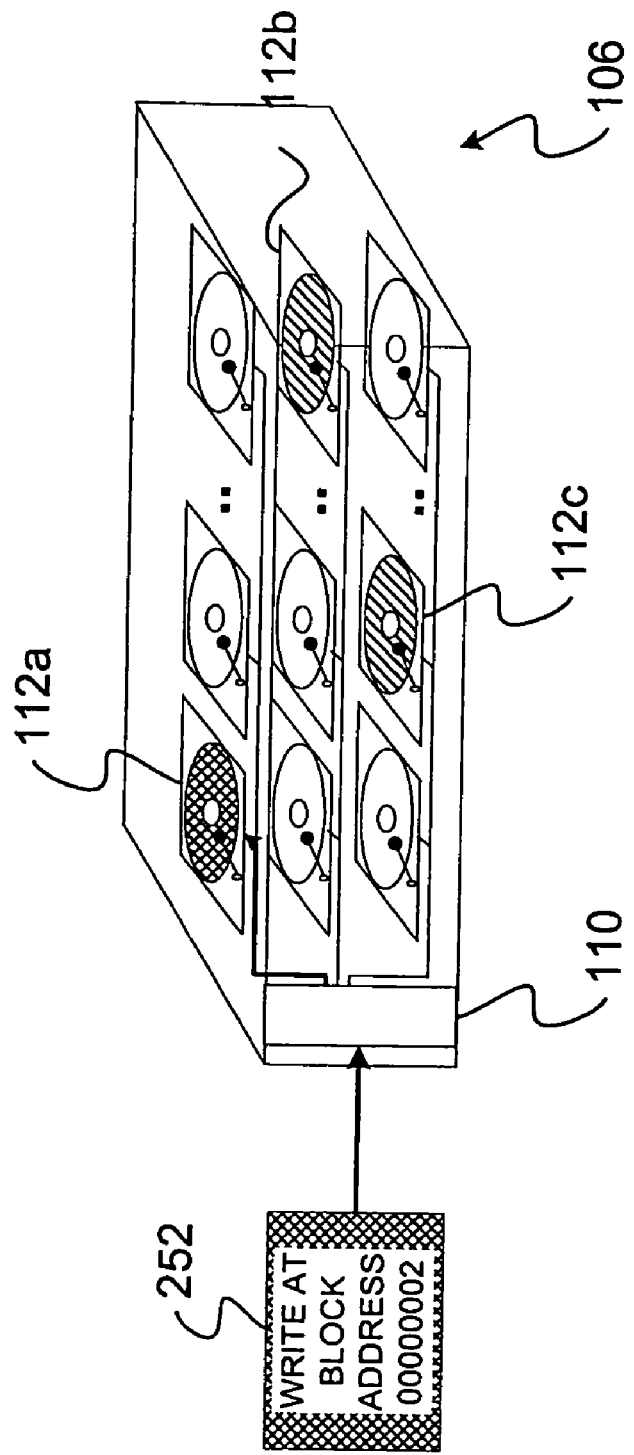

FIGS. 2 to 6 illustrate an example of device 106 operation. As shown in FIG. 2, the device receives an I/O request 250 to write a block of data at address "00000001". As shown, the controller 110 distributes this block of data between disks 112b and 112c. For illustration, FIG. 2 depicts this storage by shading disks 112b and 112c with diagonal lines even though the block only occupies a small portion of either disk 112b, 112c. FIG. 3 illustrates receipt of another I/O request 252 to write a block of data at address "00000002". As shown, the controller 110 stores the block on disk 112a. Due to the parallelism of the device 106, the requests 250, 252 may be serviced simultaneously. That is, the blocks may be written to disks 112a, 112b, and 112c at the same time.

Figure 4:
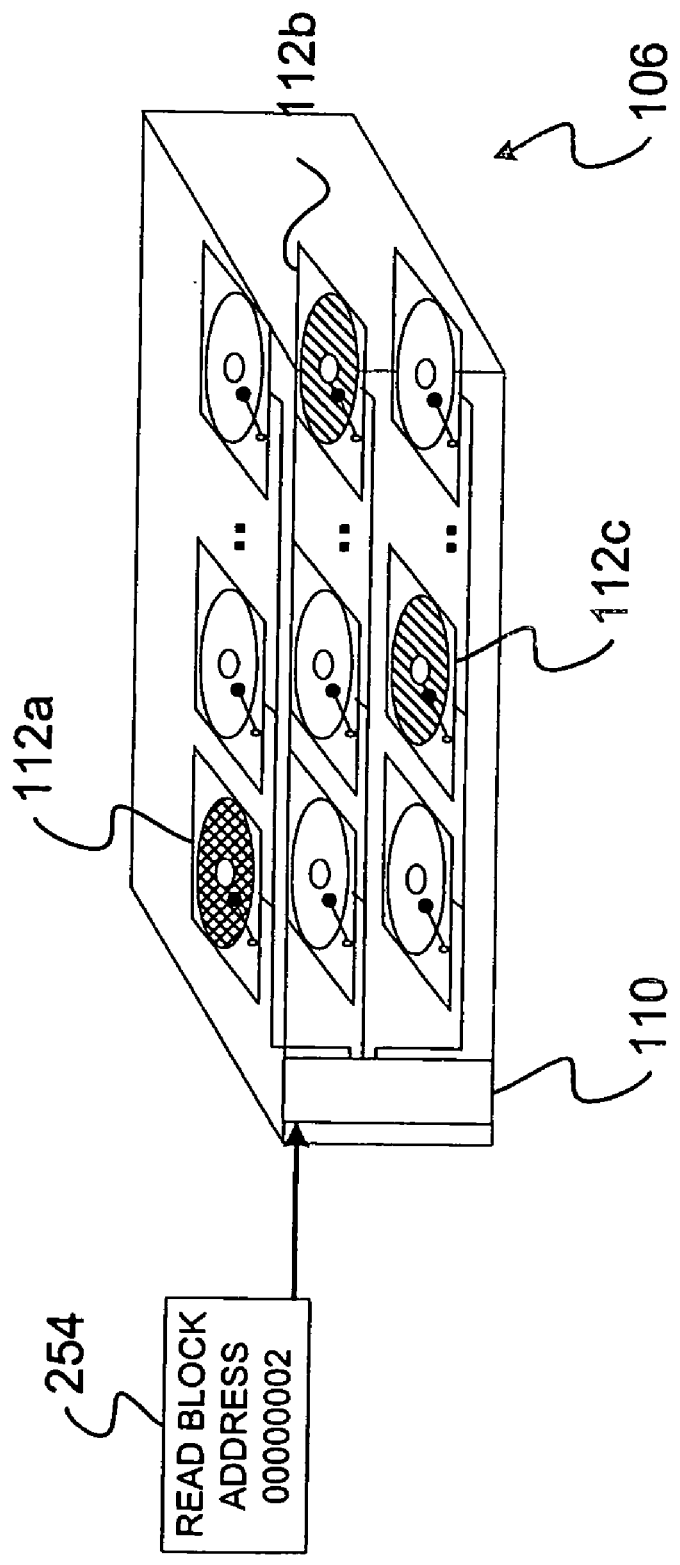
Figure 5:
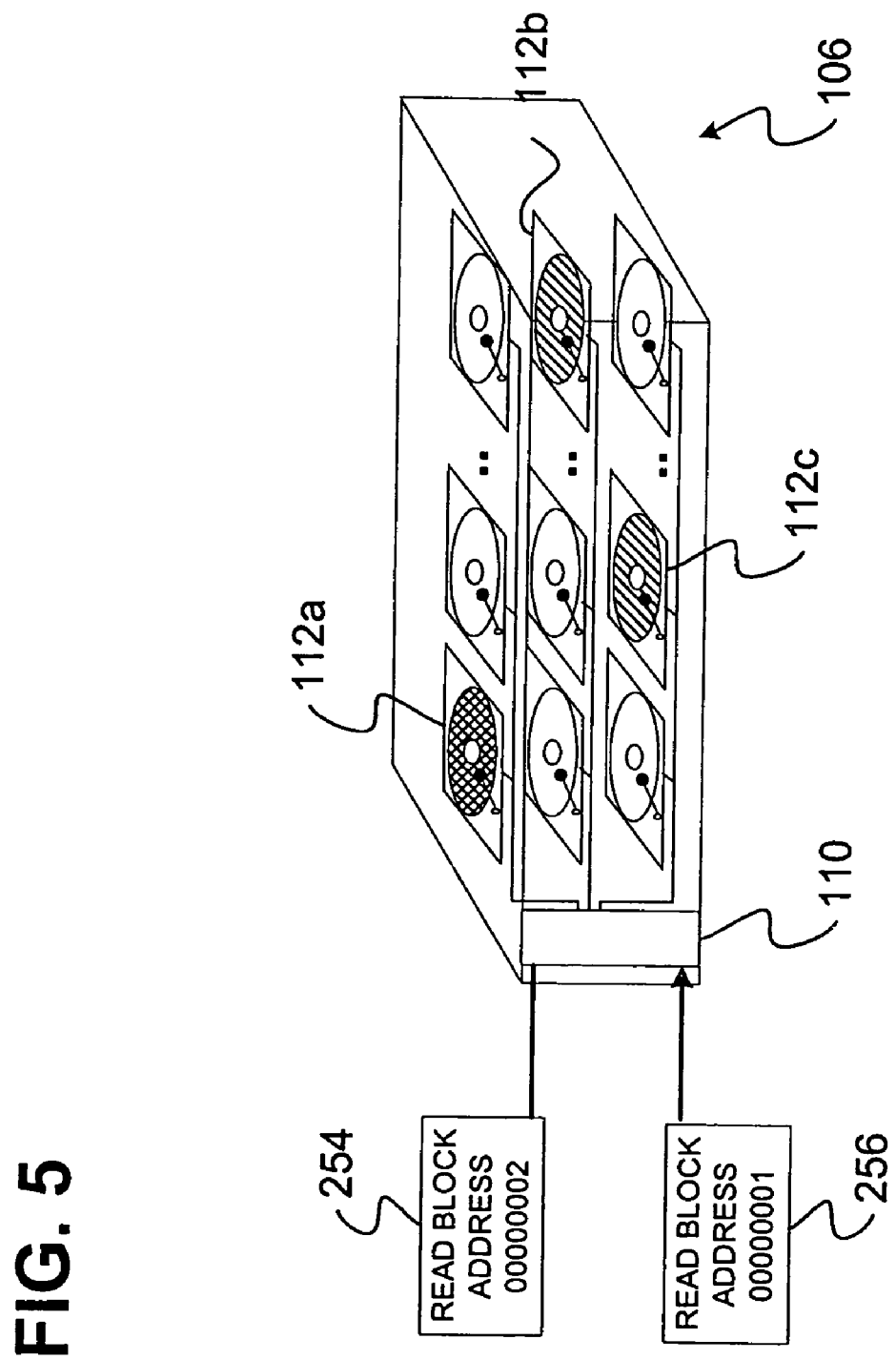
Figure 6:
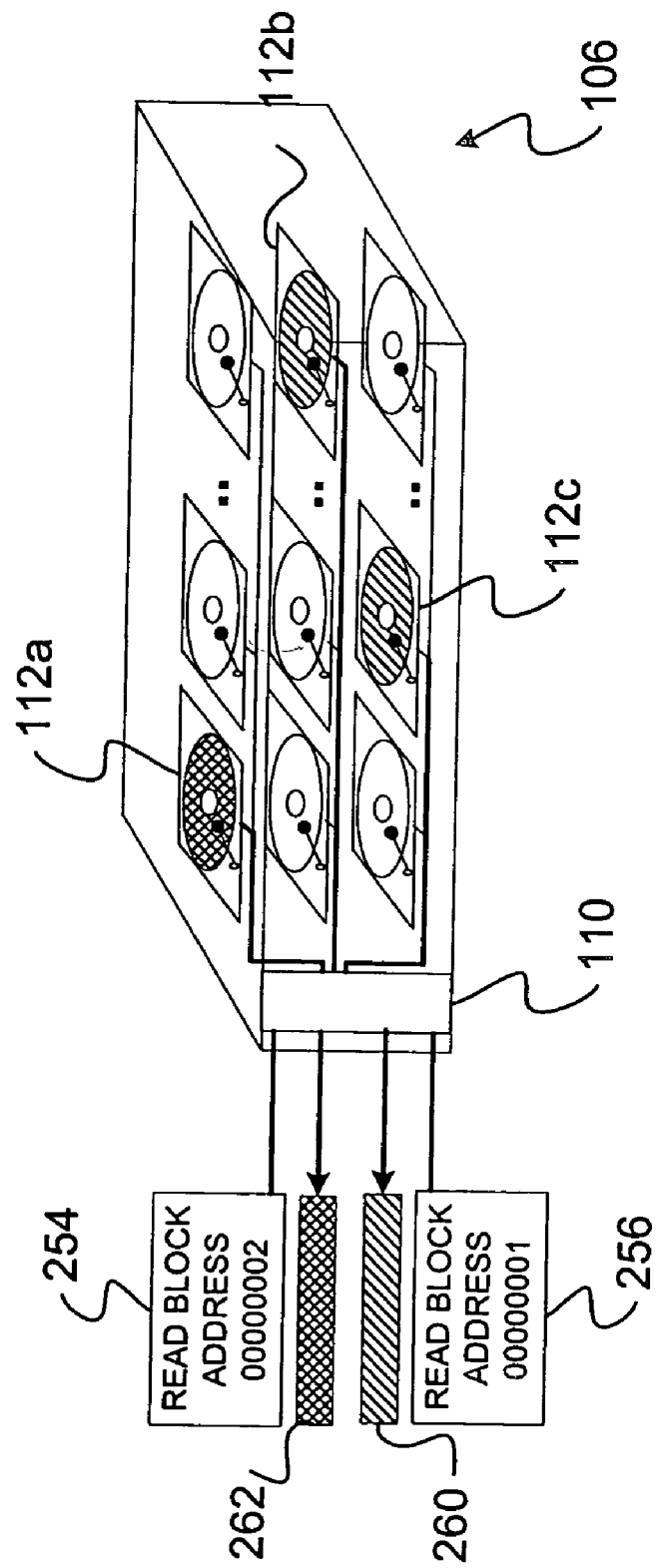

As shown in FIG. 4, the device 110 receives an I/O request 254 for the block identified by address "00000002". In response, the controller 110 initiates retrieval of this block from disk 112a. As shown in FIG. 5, before retrieving the block stored in disk 112a, the device 106 receives a request 256 for the block identified by address "00000001". Again, in response, the controller 110 initiates retrieval of the specified block from disks 112b and 112c. As shown in FIG. 6, both retrieval operations can occur at the same time and, as shown, the device 106 responds to the requests 254, 256 with the requested blocks 260, 262. While either request 254, 256 may have taken as long as with a traditional device, by operating in parallel, the device 106 has responded to both requests in less time than a serial implementation.

Figure 7:
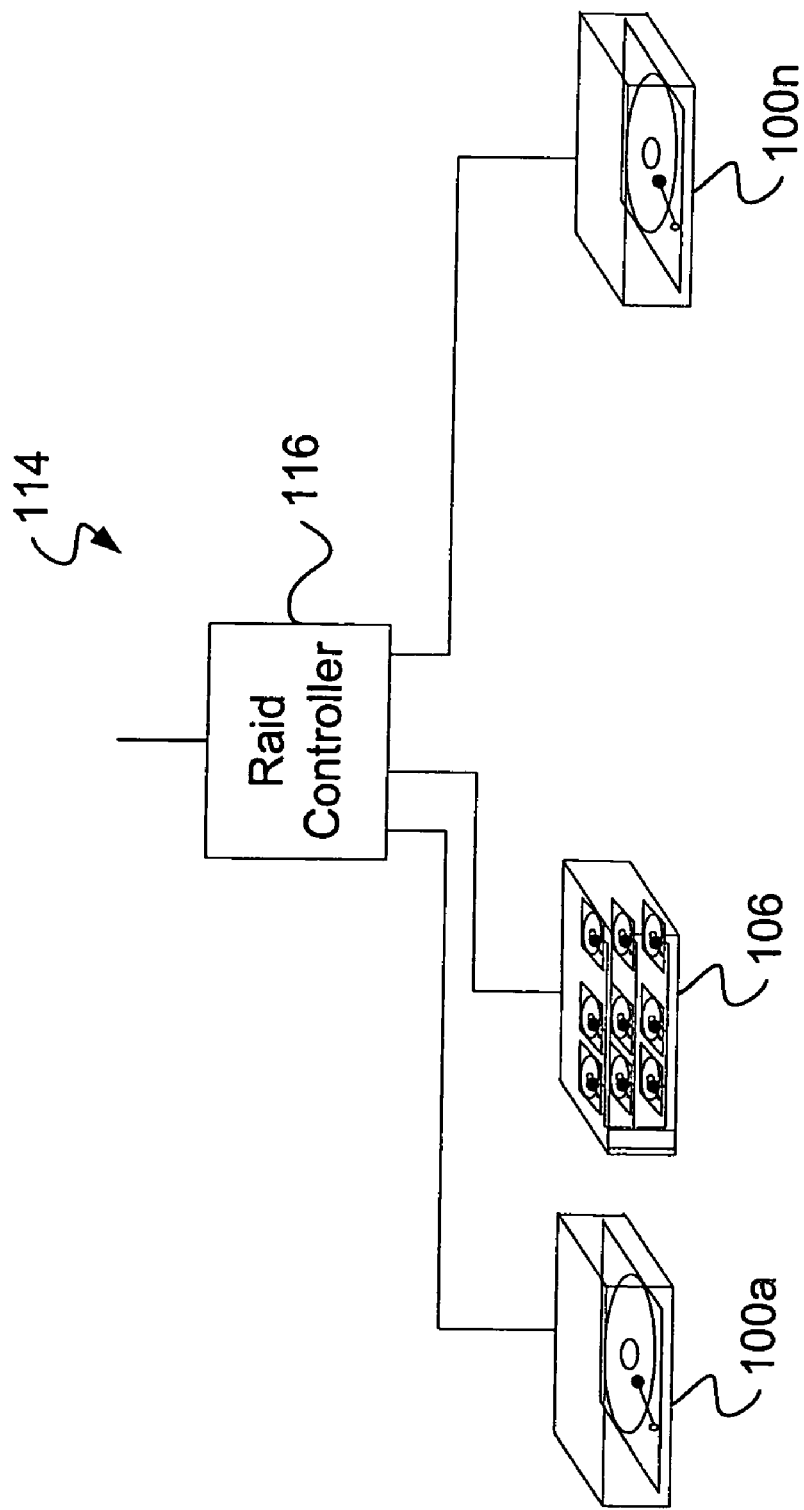
FIG. 7 is a diagram illustrating a hierarchical RAID system.

The device 106 can be used in a wide variety of systems and may be used in a wide variety of different capacities. For example, FIG. 7 illustrates use of device 106 within a grander RAID system 114. If the device 106 controller implements a RAID-scheme, the controller 116 and the device's 106 RAID controller form a RAID hierarchy. In other words, the device 106 can offer a "RAID within a RAID". While shown in FIG. 7 as participating in the RAID system 114 alongside traditional disks 100a-100n, the system 114 may feature a collection of devices 106 exclusively.

In greater detail, as shown in FIG. 7, the system 114 features a RAID controller 116 that can interact with the device 106 as it would with any other disk 100a-100n. That is, depending on the RAID scheme implemented by the controller 116 and the read or write request at hand, a device 106 may receive a strip of data, an error detection code, and/or an error correction code. The RAID scheme employed by the RAID controller 116 need not be the same RAID scheme employed by the device 106 nor does the RAID controller 116 even need knowledge of the device's 106 RAID scheme. Again, to RAID controller 116, the device 106 is just another traditional disk 100a-100n.

As an example, assume RAID controller 116 implements a RAID 0 stripping scheme. After receiving a write request to store the data "EMC Corporation", the RAID controller 116 could send "EMC C" to disk 100a, "orpor" to device 106, and "ation" to device 100n. After receiving the strip "orpor" from the RAID controller 116, the device's 106 RAID controller may in turn break down the "orpor" data and store "o" on internal disk 1, "r" on internal disk 2, "p" on internal disk 3, and so forth.

Figure 8:
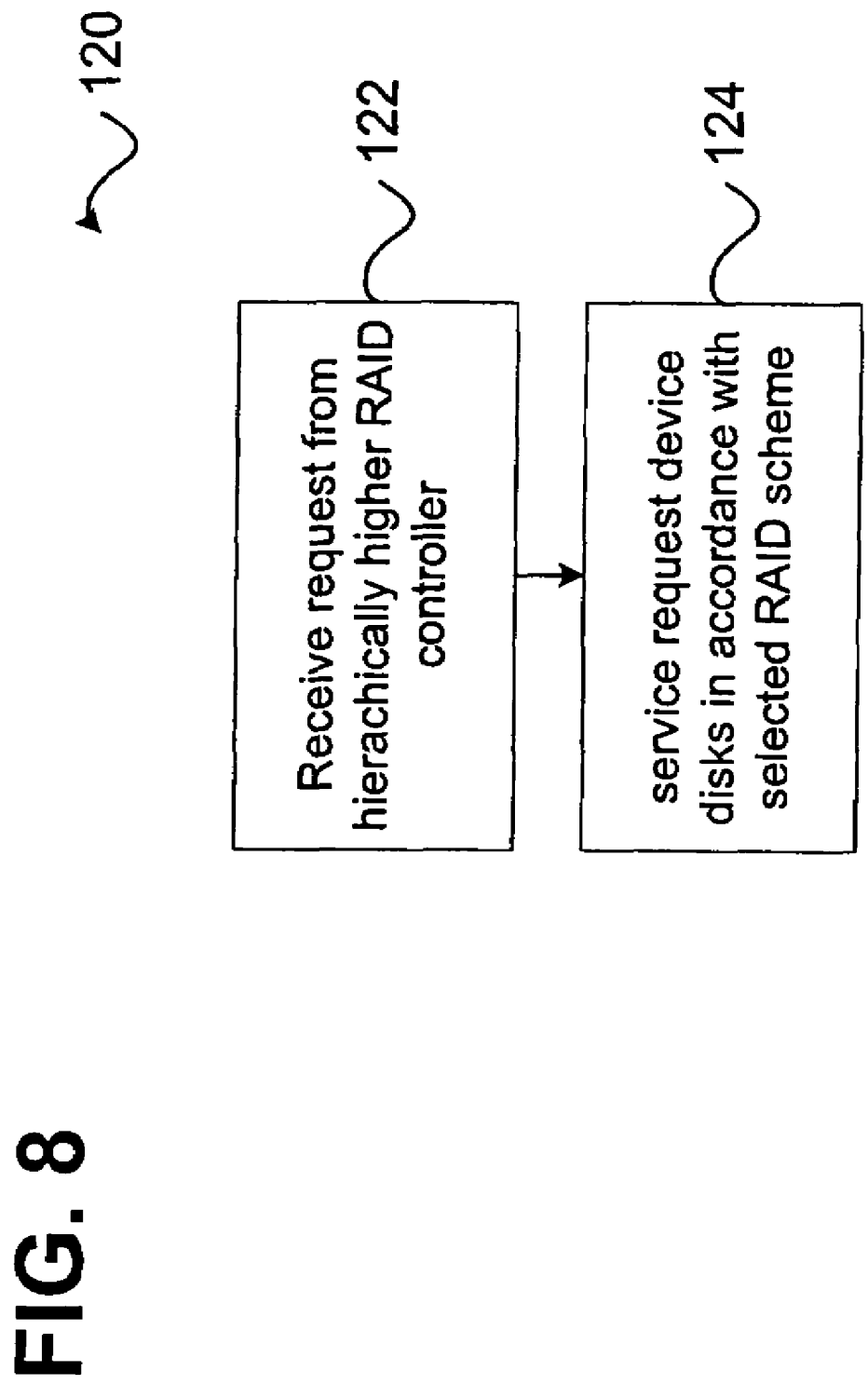
FIG. 8 is a flow-chart illustrating operation of the hierarchical RAID system.

FIG. 8 depicts a flow-chart 120 illustrating operation of the device 106 within the RAID system 114 of FIG. 7. As shown, the device 106 receives 122 a data request (e.g., a read or write request) from the hierarchically-higher RAID controller 116 and services 124 the request in accordance with the device's 106 RAID scheme. For example, as described above, if the device 106 uses RAID 0, the device's 104 RAID controller 108 can store different strips of data of a write request on different disks 112a-112n.

Figure 9:
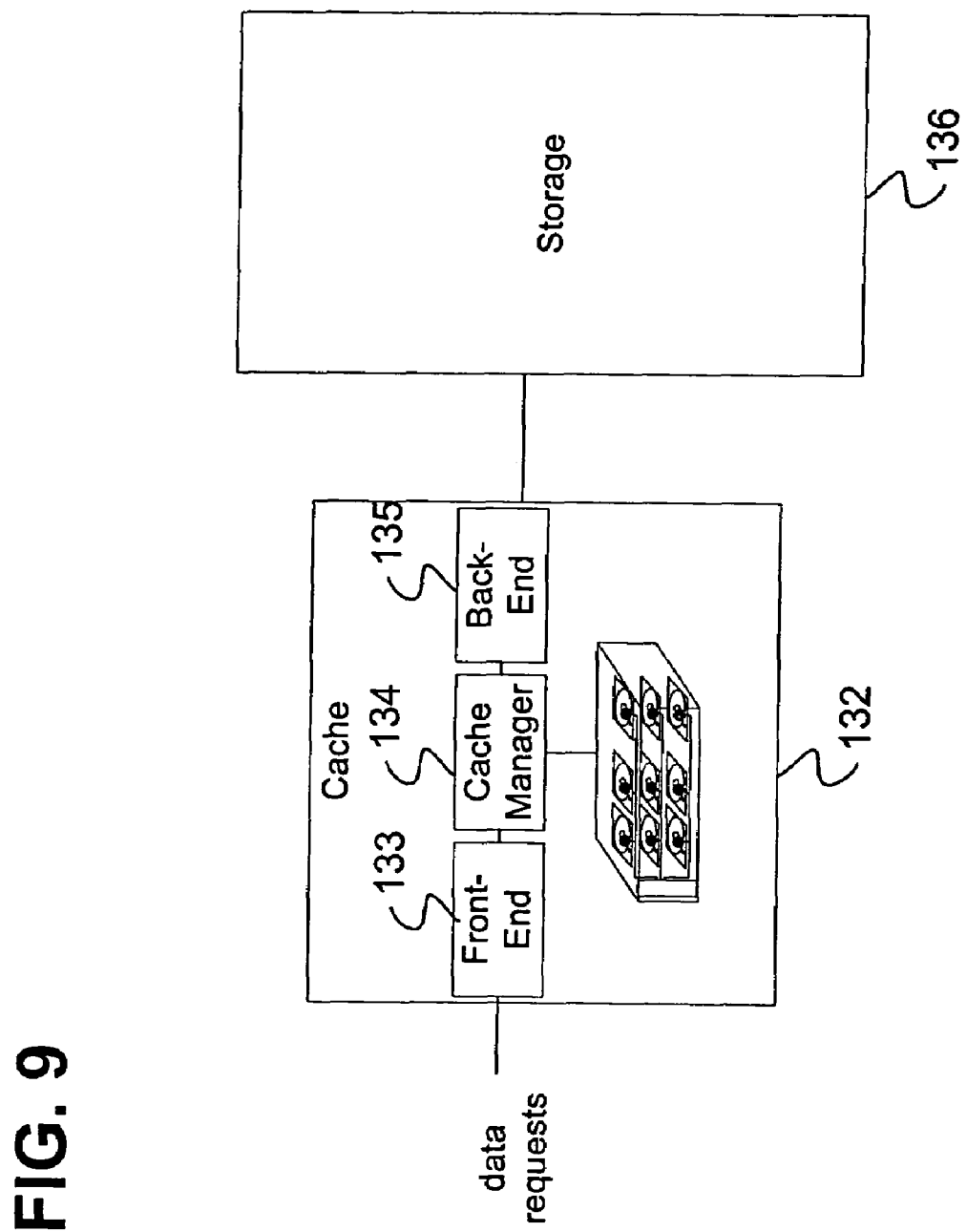
FIG. 9 is a diagram illustrating a cache that includes the data storage device.

The device 106 may be used in a wide variety of other applications. For example, FIG. 9 illustrates use of the device 106 in a cache 132 for some other data storage system 136 (e.g., a mass storage device having a larger storage capacity than the cache 132).

Despite conventional wisdom that holds high speed memory chip caches should be used to mask the slower speed of disk based data storage, using device 106 in a cache 132 can offer a number of potential advantages over memory chips. For example, as disks retain their contents absent power, the device 106 can offer greater data protection in the event of a power failure. The device 104 can also potentially enlarge the storage capacity of a cache. Additionally, depending on its configuration, the device 104 may also offer better thermal, power, and data density characteristics. Further, in the current marketplace, the device 106 may reduce the cost of a cache 132 relative to a memory chip implementation. Co-pending U.S. application Ser. No. 10/001,317, now U.S. Pat. No. 6,973,537, entitled "Disk Cache Interfacing System and Method", describes such a cache in greater detail.

As shown, in addition to the device 106, the cache 132 includes a front-end interface 133 that receives requests for storage, a back-end interface 135 that communicates with storage 136, and a cache manager 134 that performs a wide variety of caching tasks. For example, the cache manager 134 can translate an address of data in storage device 136 to the data's corresponding address within cache 132 storage 104. That is, while a piece of data may have address "00000001" in data storage system 136, due to the dynamically changing contents of the cache 132, the data may be located at "00005" in the cache 132 at one moment and at location "00009" at another.

The cache manager 134 can perform a wide variety of other caching tasks. For example, in the case of a request for data not currently held within the cache 132, the cache manager 134 may allocate cache space and initiate transfer of data from the storage device 136 into the cache. The cache controller 134 may also remove older items from the cache storage 106, for example, using an LRU (Least Recently Used) data ejection scheme. In addition to speeding servicing of read requests, the cache can also speed write requests by buffering the write data for deferred transfer to storage device 136.

The tasks performed by the cache 132 and device controller may be combined or distributed in a wide variety of ways. For example, the front-end interface 133, the cache manager 134, and the back-end interface 135 may be integrated into the device controller 100.

To illustrate different applications described above, FIG. 10 depicts a data storage system 150 that uses the device 106 in a variety of capacities. The sample data storage system 150 shown is EMC® Corporation's Symmetrix® data storage system. As shown, the Symmetrix® system 150 uses a shared cache 146 to speed host processor 140a-140n access to data stored by a collection of storage devices 100a-100n, 106.

In greater detail, the system 152 includes front-end processors 142a-142n that receive requests from the hosts 140a-140n for access to data stored by the storage devices 100a-100n, 106. The front-end processors 142a-142n determine whether the cache 146 currently stores requested data. If so, the front-end processors 142a-142n can use the cached data to quickly satisfy the host 140a-140n request. If not, the front-end processor 142a-142n can ask a back-end processor 148a-148n to load the appropriate data into the cache 146 from the storage devices 100a-100n, 106. Thus, if another request for the same data soon follows, the front-end processors 142a-142n can quickly respond to the request without waiting for retrieval by the back-end processors 148a-148n.

FIG. 9 also depicts a second cache 144 interposed between the hosts 140a-140n and the Symmetrix® system 152. This second level of caching can reduce the number of I/O requests that ultimately reach the Symmetrix® system 152. Alternatively, the system 152 may feature a wide variety of other cache configurations and schemes.

Figure 10:
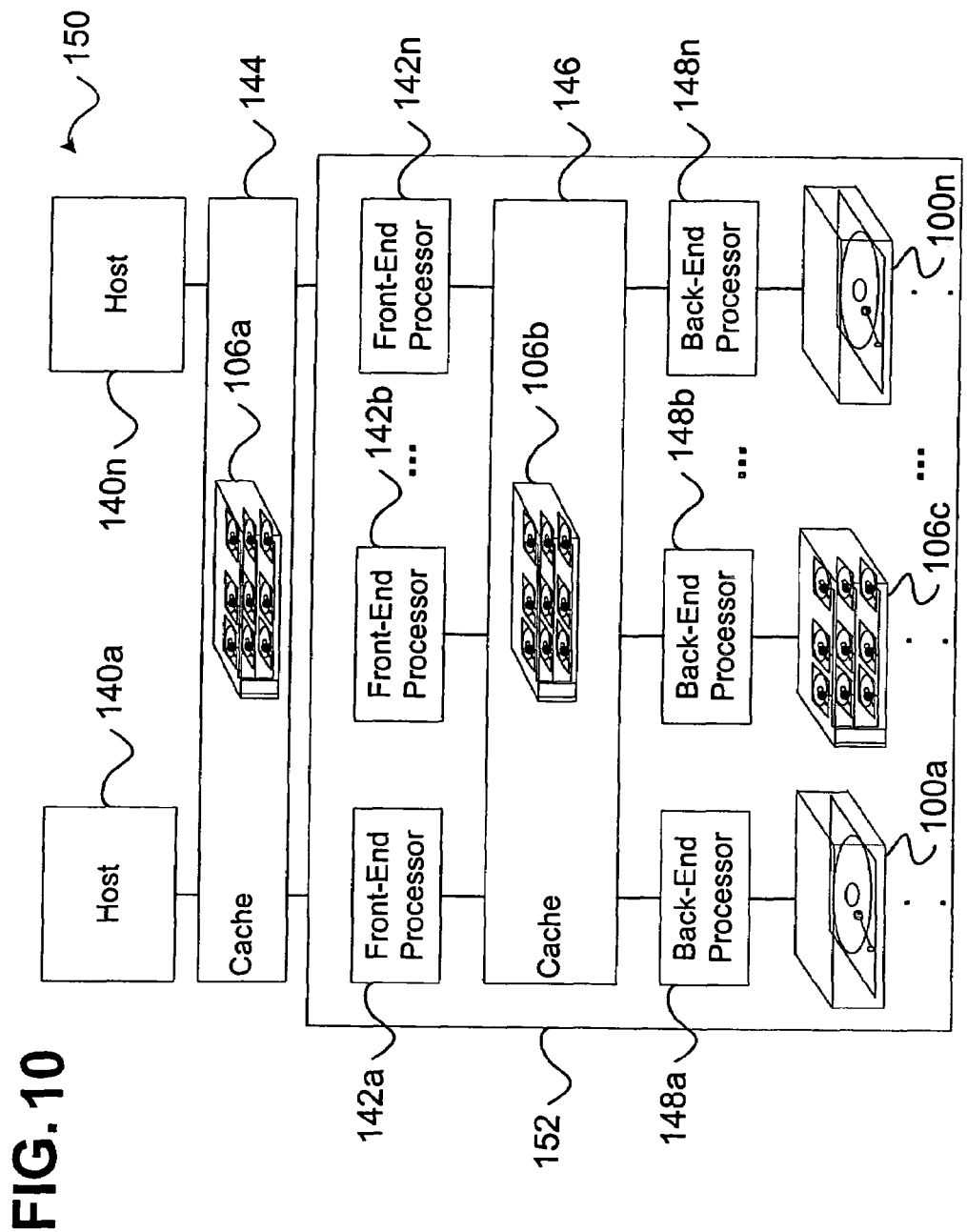
FIG. 10 is a diagram of a storage system that uses the data storage device in different capacities.

As shown in FIG. 10, the device 106 may fulfill a number of different capacities within the system 150. For example, the device 106 can provide data storage for cache 144 and/or cache 146. Additionally or alternatively, the device 106 may provide back-end data storage 106c along with or instead of traditional data storage units 100a-100n.

Figure 11:
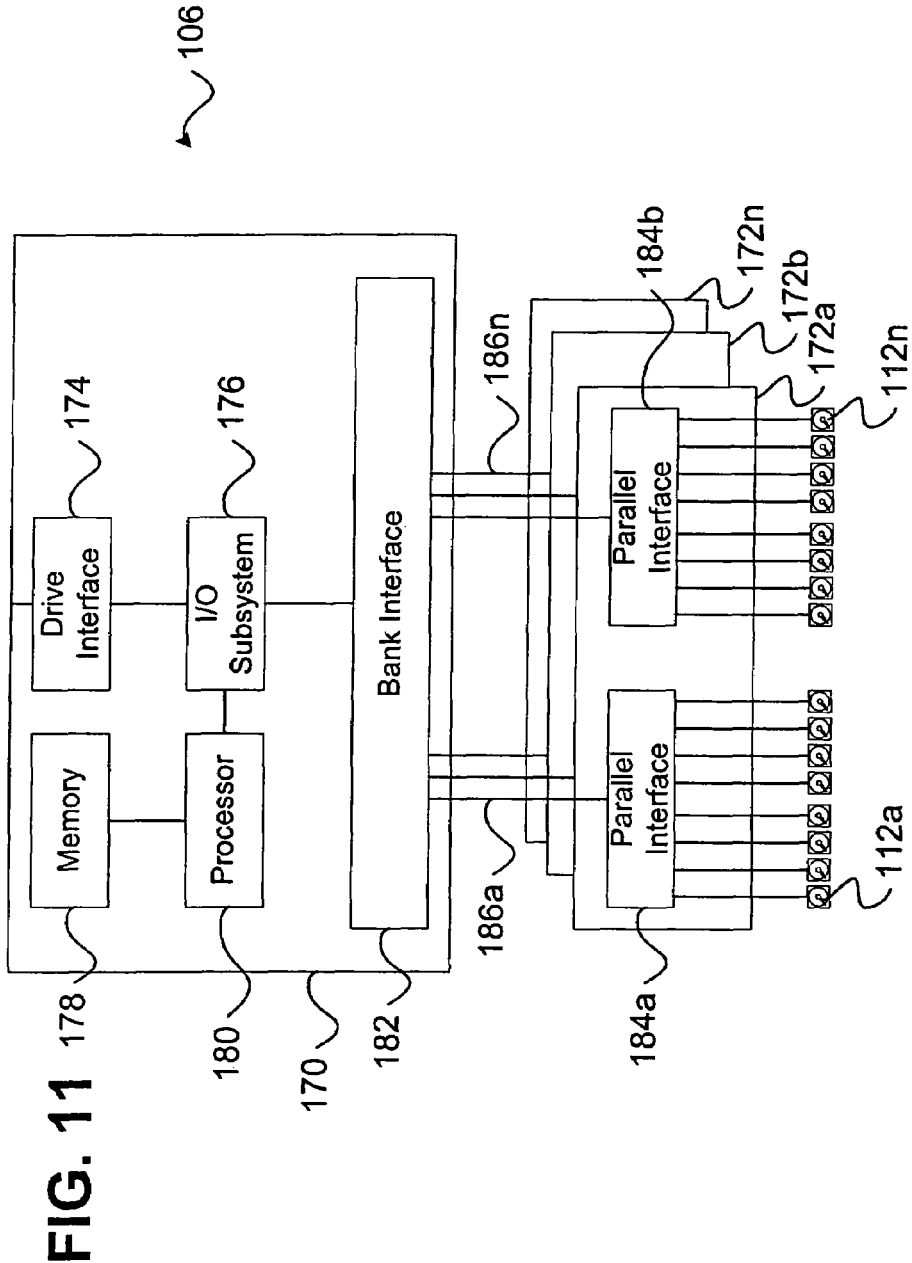
FIG. 11 is a diagram illustrating a sample implementation of the device.

FIG. 11 illustrates a sample implementation of the device 106. The sample implementation features a controller card 170 that connects to a collection of storage cards 172a-172n. The storage cards 172a-172n, in turn, provide access to drives 112a-112n (e.g., IDE (Integrated Disk Electronics) drives).

As shown in FIG. 11, the storage cards 172a-172n are divided into banks by parallel interfaces 184a, 184b. For example, the parallel interfaces 184a, 184b may feature a Compact Flash IDE interface that can service eight drive channels.

The parallel interfaces 184a, 184b receive data requests from the controller card 170 and, if necessary, can translate these requests into a protocol adopted by the drives 112a-112n (e.g., IDE or SCSI). The parallel interfaces 184a, 184b can concurrently issue different requests to the drives 112a-112n. Again, generally speaking, the more spindles seeking blocks of data, the greater the throughput.

The implementation shown features serial connections 186a, 186n between the parallel interfaces 184a, 184n and the controller card 170. Thus, the parallel interfaces 184a, 184n may feature queues to buffer data requests received from the controller card 170.

As shown, the controller card 170 includes a drive interface 174 that handles communication with a system using the device 106. For example, the drive interface 174 may emulate a single Fibre Channel disk drive by implementing a corresponding communication protocol. For instance the driver interface 174 may feature a protocol interface chip such as a Tachyon® FC controller.

The controller card 170 also includes a controller that includes processor 180 that implements a given data access scheme. The instructions for implementing the storage scheme may be stored in memory 178. The processor 180 may access data requests received by an I/O subsystem 176 and perform calculations (e.g., stripping, error correction, and error detection). After such tasks, the processor 180 can forward a data request to a bank interface 182 indicating the bank 184a, 184b and disk 106a-106n storing a requested block of data (e.g., a block of data to read or write). Based on this information, the bank interface 182 can route a data request to the determined bank 184a, 184b via a corresponding serial connection 186a, 186n and await a response.

This arrangement can also enable utilization of the aggregate parallel processing capabilities of the individual controller cards to perform distributed computing and I/O tasks. This can include performance-enhancing operations such as write re-ordering, elevator algorithms, and so forth.

Figure 12:
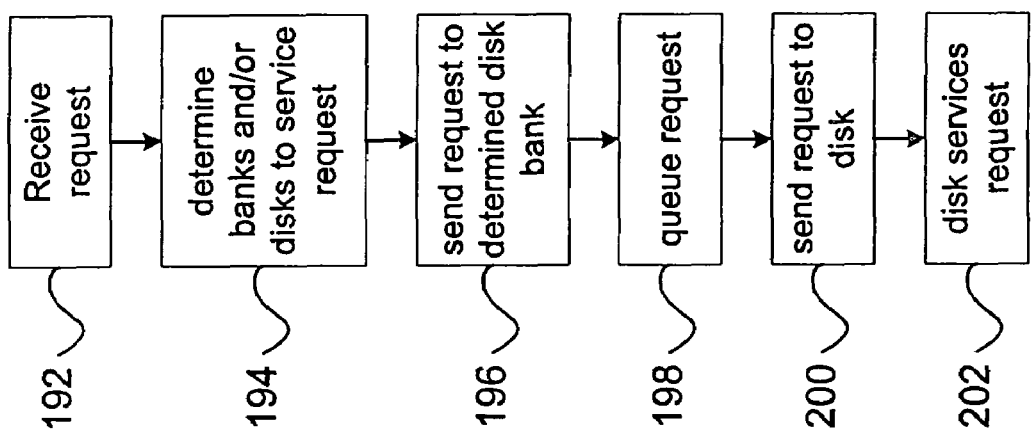
FIG. 12 is a flow-chart illustrating operation of the sample implementation.

FIG. 12 depicts a flow-chart illustrating operation of the sample implementation shown in FIG. 11. As shown, the device receives 192 a data read or write request. For example, the device may receive an I/O request specifying an address of a block of data storage. The device then determines 194 the bank(s) and/or disk(s) storing data block involved in request in accordance with the data access scheme implemented by the device 106 controller. The controller 170 then routes 196 one or more requests to the appropriate banks. A bank parallel interface may queue 198 a request depending on the availability of the drive(s) storing the data block. Thereafter, the bank may send 200 the queued request to the disk(s), await 202 the response (e.g., retrieved data or an indication of a successful write), and forward or compose a result of the disk access to the controller. The controller may in turn forward or compose a response to whatever entity the device received the original request from. Alternatively, the device 106 may determine that a portion of the spindles are "busy" and queue yet another request that may be serviceable from another portion of the device. If multiple drives store a requested block, the controller may assemble the block as the block portions arrive.

Again, the implementation and operation illustrated by FIGS. 11 and 12 are merely examples. A wide variety of other implementations do not feature elements shown in FIG. 11. For example, a device 106 need not divide components between controller 170 and data storage cards 172a, 172n. Additionally, components may be arranged in a wide variety of serial and parallel configurations depending on the type of drives 112a-112n, bus architecture, and so forth.

Figure 13:
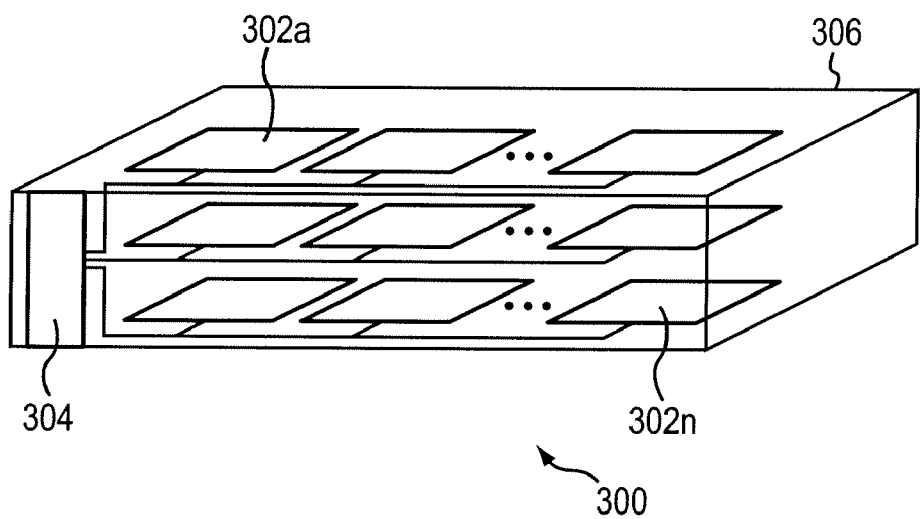
FIG. 13 is a schematic diagram illustrating an alternative embodiment of the data storage device.

An alternative embodiment of the data storage device is shown at 300 in FIG. 13. In this embodiment, a plurality of non-volatile memory devices, having a size that enables them to fit in the standard form factor previously described with reference to FIG. 1. As shown in FIG. 3, the data storage device 300 includes a plurality of non-volatile memory devices 302a-302n connected to a device controller 304. As shown, the non-volatile memory devices 302a-302n and controller 304 can be enclosed, for example, in a housing 306 previously designed to store fewer disks. For example, the housing 306 may conform to a standard form factor (e.g., full height drives, half-height drives, or low-profile). Alternatively, the housing 306 may feature some other, non-standard, form (e.g., a custom design for rack-mounting).

Non-volatile memory devices 302a-302n may include any type of non-volatile memory, including, but not limited to, flash memory; compact flash memory; magnoresistive RAM; ferroelectric RAM; any type of volatile memories, such as dynamic and static RAM, maintained as non-volatile with the use of a power subsystem such as batteries or capacitance devices; mechanical memory devices and microelectromechanical memory devices. Non-volatile memory devices 302a-302n may include only one of these non-volatile memory types or any combination of these non-volatile memory types.

The device 300 controller 304 may provide a device interface that emulates a traditional disk 100, FIG. 1, interface. For example, the data storage interface may conform to an interface protocol such as SCSI (Small Computer System Interface), Fibre Channel, Infiniband, and so forth. Thus, a system using the device 300 to store data could communicate with the device 300 as it would with a traditional device 100. This can permit a system manager to quickly upgrade the performance of a system by replacing a traditional disk 100 with device 300.

In operation, the device 300 will operate in a manner similar to the device 106, as previously described with reference to FIGS. 1-6. Furthermore, the device 300 may be used in a wide variety of systems and in a wide variety of different capacities, such as those previously described with reference to FIGS. 7-12.

The techniques described herein are not limited to a particular hardware or software configuration and may find applicability in a wide variety of computing or processing environments. The techniques may be implemented in hardware or software, or a combination of the two. Preferably, the techniques are implemented in computer programs executed by a processor and a storage medium readable by the processor (including volatile and non-volatile memory and/or storage elements).

Each program may be implemented in high level procedural or object oriented programming language to communicate with a computer system. However, the programs can be implemented in assembly or machine language, if desired. In any case the language may be compiled or interpreted language. Each such computer program may be stored on a storage medium or device (e.g., ROM, CD-ROM, or hard disk) that is readable by a programmable processor.

Other embodiments are within the scope of the following claims.

What is claimed is:

1. A data storage system, comprising: a set of storage devices, each storage device being configured to store and retrieve data in response to data access commands from a set of external host computers;
    first-tier RAID control circuitry coupled to the set of storage devices, the first-tier RAID control circuitry being configured to apply a first RAID scheme on the set of storage devices in a manner that treats the set of storage devices as a first array under application of the first RAID scheme; and
    second-tier RAID control circuitry coupled to the first array of storage devices, the second-tier RAID control circuitry being configured to apply a second RAID scheme on a set of storage sub-devices of a storage device of the set of storage devices in a manner that treats the set of storage sub-devices of that storage device as a second array under application of the second RAID scheme;
    wherein each storage device of the set of storage devices has at least one non-volatile memory device, the at least one non-volatile memory device being selected from the group consisting of: flash memory; compact flash memory; magnoresistive RAM; ferroelectric RAM; dynamic RAM and static RAM being maintained as non-volatile with the use of a power subsystem and microelectromechanical memory devices;
    wherein the storage device having the set of storage sub-devices includes, as the storage sub-devices, non-volatile memory devices being selected from the group consisting of flash memory; compact flash memory; magnoresistive RAM; ferroelectric RAM; dynamic RAM and static RAM being maintained as non-volatile with the use of a power subsystem and microelectromechanical memory devices;
    wherein the first-tier RAID control circuitry is adapted to treat each storage device of the set of storage devices as exactly one RAID device when applying the first RAID scheme to store particular data in the set of storage devices; and
    wherein the second-tier RAID control circuitry is adapted to treat each storage sub-device of the set of storage sub-devices as exactly one RAID device when applying the second RAID scheme to store a portion of the particular data in the set of storage sub-devices in order to store the particular data in a RAID-within-RAID manner.

2. The data storage system of claim 1, further comprising a device interface to receive I/O requests, wherein the device interface comprises an interface configured to conform to a protocol.

3. The data storage system of claim 2, wherein the protocol comprises at least one of the following: SCSI (Small Computer System Interface), Fibre Channel, and INFINIBAND.

4. The data storage system of claim 1, further comprising a housing.

5. The data storage system of claim 4, wherein the housing has one of the following form factors: standard, half-height, and low-profile.

6. The data storage system of claim 1, wherein RAID data comprises at least one of: a stripe, an error detection code, and an error correction code.

7. The data storage system of claim 1, wherein the data storage device is configured to perform cache operations, the data storage device further comprising a cache manager.

8. The data storage system of claim 7, wherein the cache manager comprises a manager configured to perform at least one of the following: translate an address of a different storage device to a cache address; cache data included in a write request; load data from the different storage device; and remove cache data.

9. The data storage system of claim 1, further comprising a controller card that includes a controller and connections available to couple with more than one storage card that provides access to a least two of the storage devices.

10. The data storage device of claim 9, wherein the storage card comprises a card having at least one parallel interface to a collection of the storage devices.

11. The data storage system of claim 9, wherein the connection between the controller and the storage card comprises a serial connection.

12. The data storage system of claim 9, wherein the controller comprises a bank interface that routes data requests to an associated bank of storage devices.

13. The data storage system of claim 1 wherein the first-tier RAID control circuitry and the second-tier RAID control circuitry define a RAID hierarchy.

14. The data storage system of claim 1, wherein the second-tier RAID control circuitry is electrically coupled subsequent to, and in series with, the first-tier RAID control circuitry, the second-tier RAID control circuitry being further configured to apply the second RAID scheme on the set of storage sub-devices of the storage device of the set of storage devices to store the portion of the particular data in the set of storage sub-devices (i) after application of the first RAID scheme on the set of storage devices by the first-tier RAID control circuitry and (ii) after receiving the portion of the particular data from the first-tier RAID control circuitry.

* * * * *